United States Patent [19]
Sellers

[11] Patent Number: 5,995,026
[45] Date of Patent: Nov. 30, 1999

[54] PROGRAMMABLE MULTIPLE OUTPUT FORCE-SENSING KEYBOARD

[75] Inventor: Charles A. Sellers, Houston, Tex.

[73] Assignee: Compaq Computer Corporation, Houston, Tex.

[21] Appl. No.: 08/955,334

[22] Filed: Oct. 21, 1997

[51] Int. Cl.[6] .......................... H03K 17/94; H03M 11/00
[52] U.S. Cl. .............................. 341/34; 341/22; 345/168; 400/481
[58] Field of Search ........................ 341/22, 34; 345/168; 400/480, 481; 340/825.31, 825.34

[56] References Cited

U.S. PATENT DOCUMENTS

5,675,329  10/1997  Barker et al. .............................. 341/22
5,832,214  11/1998  Kikinis ...................................... 380/25

Primary Examiner—Michael Horabik
Assistant Examiner—Timothy Edwards, Jr.
Attorney, Agent, or Firm—Konneker & Smith, P.C.

[57] ABSTRACT

Representatively using force sensing resistors as key switch elements, keys on a computer keyboard are each provided with pluralities of different keystroke output function signals which may be selectively varied in response to simply altering the user keystroke force imposed on the key. In addition to being provided with a default key force range/output signal correlation, the keyboard may be programmed by the user to customize the key depression force ranges associated with selected different keystroke output signals. Representatively illustrated additional uses of this key force/output signal correlation capability include a key force-based typing correction mode and a combination character and key force sequence-based user password access system. To further expand the individual key functionality of the keyboard, a combination of sensed key depression force and duration is used to generate an additional keystroke output function signal for a given key.

37 Claims, 6 Drawing Sheets

PROGRAMMABLE MULTIPLE OUTPUT FORCE-SENSING KEYBOARD

BACKGROUND OF THE INVENTION

1. Field of the Invention

The present invention generally relates to keyboard apparatus and, in a preferred embodiment thereof, more particularly relates to a computer keyboard in which some or all of its keys are operative to output a plurality of different keystroke signals corresponding to differing user keystroke force ranges used to depress the keys.

2. Description of Related Art

In conventional computer keyboards the manual depression of a given key through its operating stroke, without some supplemental action taken by the computer user, generates a single output function signal. For example, depression of the "A" key with no other action taken by the user outputs a keystroke signal which is utilized by the computer to generate the lower case letter "a" on the computer display screen. If the user wants the selected letter capitalized, he must take a supplemental action to achieve the desired result. For example, he must hold down the shift key while depressing the "A" key, toggle the "Caps Lock" key before striking the "A" key, or make an appropriate format selection in the particular word processing program that he is using.

Similar supplemental actions must be taken to change the nature of the keystroke output signal generated in response to the depression of a character key to, for example, bold, italicize, underline or otherwise change the displayed image associated with the key. Function keys (such as the F1–F12 keys) on conventional computer keyboards are also subject to this same "single function" limitation when they are depressed without any supplemental action taken by the computer user such as depressing the "Shift", "Ctrl" or "Alt" keys while depressing a selected function key.

While this conventional approach of requiring a user to take a supplemental action (in addition to simply depressing a selected key) to alter the base keystroke output signal of a key serves its intended purpose of expanding the overall usefulness of a given number of keys on a particular keyboard, it can be somewhat confusing for beginning computer users while at the same time being cumbersome for even experienced computer users familiar with the various operation combinations required to vary the output signal of a given keyboard key.

From the foregoing it can be seen that a need exists for a simpler procedure to selectively vary the output signal of a selected key on the keyboard of a computer or other electronic device. It is to this need which the present invention is directed.

SUMMARY OF THE INVENTION

In carrying out principles of the present invention, in accordance with a preferred embodiment thereof, an electronic apparatus is provided which is representatively a computer and comprises a screen on which generated indicia may be displayed, and a specially designed keyboard apparatus which is useable to generate indicia on the computer display screen.

The keyboard apparatus includes key structures supported for depressions through operative strokes by selectively variable force applied by a user of the computer to the key structures, and force receiving structures associated with the key structures and operative to receive at least portions of the key stroke depression forces and responsively generate key force signals each having a magnitude related in a predetermined variable manner, representatively a proportional manner, to its associated key stroke depression force. The force receiving structures are preferably force sensing resistor devices that underlie the key structures and are operative as both key stroke force detecting devices and as normally open key switch devices closeable in response to forcible depression of their associated key structures.

A control system is associated with the force receiving structures and is operative to utilize key force output signals therefrom to responsively generate, for each key structure, a plurality of different key stroke output signals which correspond in a predetermined manner to a plurality of different ranges of key stroke depression force and may be utilized in creating different output functions for the key structure in sole response to its depression.

For example, if "low", "normal" and "high" depression force ranges are used the output function of a given key may be (1) a "struck in error—no character display" when the key is struck with a force in the "low" force range, (2) the generation of the key's normal typing character on the display screen when the key is struck with a force in the "normal" force range, and (3) the capitalization of the displayed character when the key is struck with a force in the "high" force range.

Accordingly, the striking of a given key can produce a plurality of predetermined results simply by striking the key with different force levels—no other action is required to achieve this desirable force-based expansion of key functionality. In accordance with another feature of the invention, the control system is operative to automatically establish the different ranges of key stroke depression force in response to a monitoring by the control system of the typing of a user on the keyboard apparatus with differing key stroke depression force levels. In this manner, a user can "teach" the keyboard to respond in a desired manner to his particular typing touch.

According to yet another feature of the present invention, the control system is further operative to sense the duration of a depression of at least one of the key structures caused by a force within a selected one of the key stroke depression force ranges and responsively alter the corresponding key stroke output signal when the sensed duration is longer than a predetermined time period. Thus, when a key is depressed with a force within the "high" force range (which, illustratively, causes the resulting displayed letter to be capitalized) and sustained for this predetermined function-changing duration, the displayed character associated with the depressed key could be, for example, bolded in addition to being capitalized.

Under additional available aspects of the present invention, the control system may be configured to be operable in other highly useful force-based modes such as, representatively, an automatic typing correction mode and a combination content/typing force password access security mode.

In its correction mode the control system is selectively operable to detect incorrect characters in typed text and the key stroke depression force range associated with each detected incorrect character, and automatically delete each detected incorrect character which was generated in response to a depression force within a predetermined one of the key stroke depression force ranges—representatively the lowest one of such force ranges.

In its password-based access protection mode, the control system is operative, in response to the typing of an access password on the keyboard by a prospective user of the computer to (1) detect the character content and sequence of the typed-in password; (2) detect the key stroke depression force range associated with each typed-in password character; and (3) permit the prospective user to operatively access the computer only if (a) the detected character contend and sequence of the typed-in password matches he character content and sequence of a predetermined password, and (b) the detected key stroke depression force range for each typed-in password character matches a predetermined key stroke depression force range associated with the typed-in password character. Thus, even if the actual password of a legitimate user of the computer is discovered by an unauthorized user the knowledge of the password is essentially worthless information without also determining the associated key stroke force level sequence associated with the password characters.

DETAILED DESCRIPTION

Figure 1:
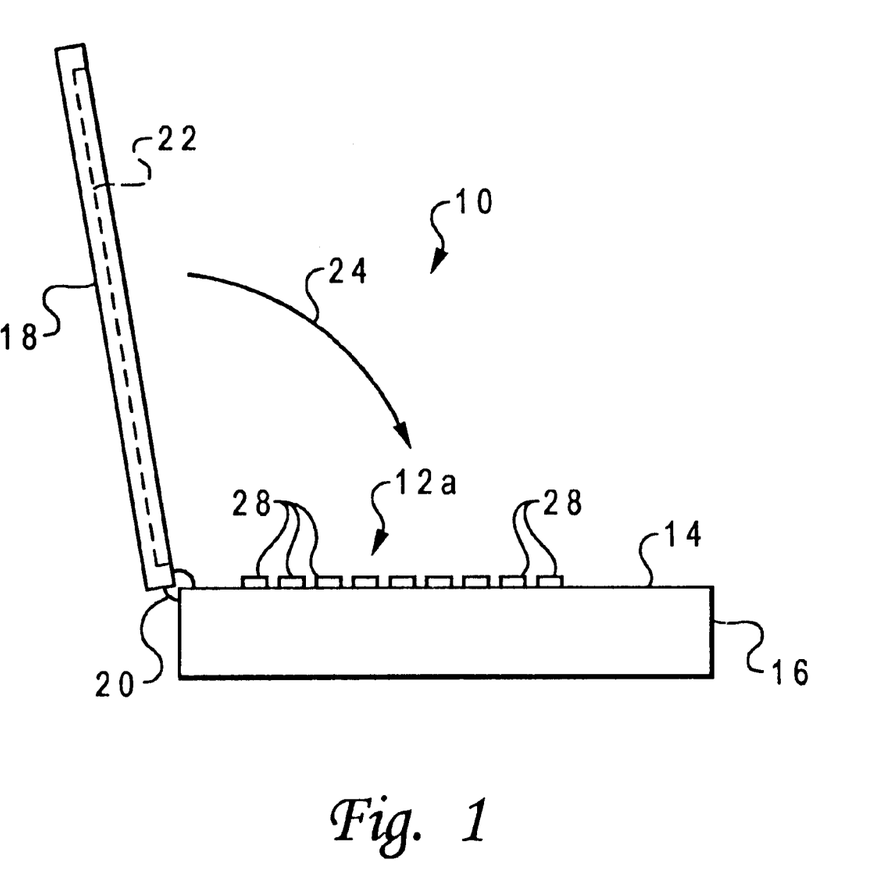
FIG. 1 is a highly simplified side elevational view of an representative opened portable notebook computer in which a specially designed force-sensing, multiple key output keyboard embodying principles of the present invention is incorporated.

Illustrated in simplified form in FIG. 1 is a representative opened portable notebook computer 10 having incorporated therein a specially designed key stroke force-sensing multiple key output keyboard 12a embodying principles of the present invention. Keyboard 12a is operatively supported on the top side 14 of a base housing portion 16 of the computer 10, with a lid housing portion 18 being pivotally secured, as at 20, to a top rear edge portion of the base housing 16. Lid housing 18 has a display screen 22 mounted on its front side. From its depicted, generally upright opened use orientation the lid housing 18 may be pivoted downwardly, as indicated by the arrow 24, to a releasably latched closed orientation in which it extends generally horizontally and overlies the keyboard 12a.

Figure 2:
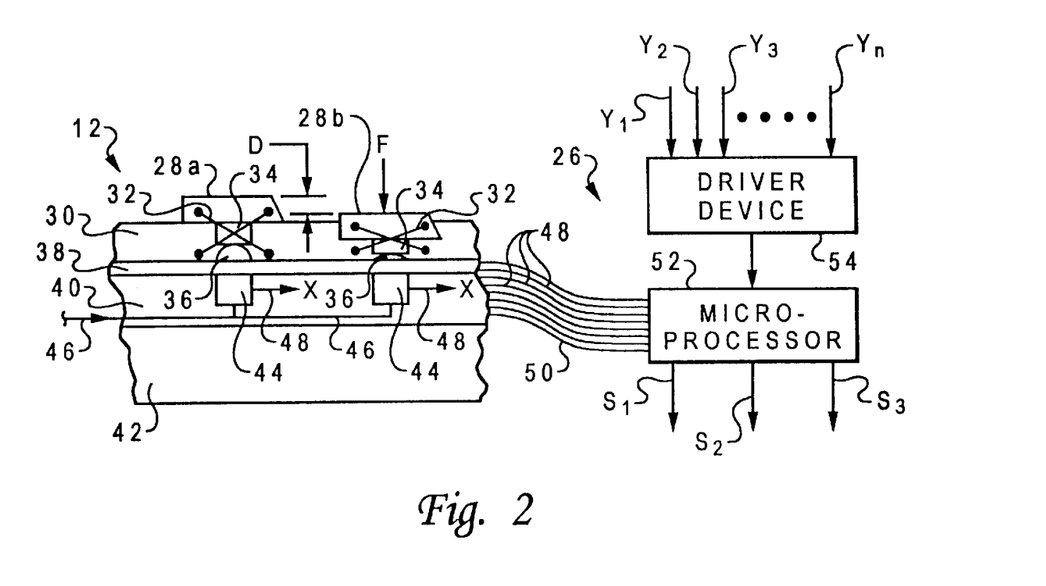
FIG. 2 is a schematic diagram of a portion of the keyboard shown in FIG. 1 and also of a desktop computer keyboard incorporating the same principles of the present invention.

In highly schematic fashion, FIG. 2 illustrates a portion of a keyboard 12 and an associated key stroke force-related control system generally designated by the reference numeral 26. Keyboard 12 may be the portable computer keyboard 12a, or one of a variety of other types of electronic apparatus keyboards, such as a desktop computer keyboard, in which principles of the present invention may be advantageously incorporated.

The keyboard 12 (of which the keyboard 12a in FIG. 1 is an example) includes a spaced series of manually depressible key members 28, with a representative pair of such key members 28a and 28b being schematically shown in FIG. 2. Key members 28a,28b are mounted on a support structure 30, representatively by suitable scissor linkages 32, for movement through a key stroke distance D between the upwardly extended position of key 28a and the depressed position of key 28b in response to a downwardly directed manual key force F exerted on the particular key being struck.

Extending downwardly from the bottom side of each key member 28 is a force exerting structure 34 which overlies an associated elastomeric dome member 36 on the top side of a dome sheet 38. Domes 36 upwardly engage the force exerting structures 34 and function as spring means for resiliently biasing the key members 28 toward their upwardly extended positions. For example, as illustrated in FIG. 2, when the key 28b is depressed its depending force exerting structure 34 downwardly flattens its underlying elastomeric dome member 36. When the force F is removed from the key 28b its associated dome member 36 returns to its undeflected configuration to upwardly return the key 28b to its original upwardly extended position. The dome sheet 38 rests atop a membrane sheet 40 which, in turn, is supported on the top side of an underlying base plate 42.

Incorporated in the membrane sheet 40 in underlying horizontal registry with the resilient domes 36 are a spaced series of force sensing resistor (FSR) switches 44. These switches are of a conventional design and are of the type commonly used, for example, in computer pointing devices such as touch pads and pointing sticks. The principle under which each switch operates is that with no force applied thereto it is in a normally open state. However, when a predetermined threshold force is applied to the switch its electrical resistance is changed in a manner closing the switch and altering its electrical resistance in a manner proportional to the magnitude of the force applied thereto. Representatively, the resistance of the switch is inversely proportional to the magnitude of the key stroke force F downwardly applied thereto.

Main electrical power is routed to the input sides of the FSR switches 44 via the schematically depicted power input lead 46. When a particular key 28 (for example, one of the keys 28a,28b illustratively depicted in FIG. 2) is struck by the computer user, the force exerting member 34 of the key downwardly deforms its underlying key return dome 36 and exerts the manual key stroke force F on the associated FSR switch 44. In turn, via a schematically depicted output lead 48 connected thereto, the FSR switch upon which the force F is imposed transmits an electrical output signal X which, as described above, has a magnitude proportional in a predetermined manner to the magnitude of the key stroke force F.

The FSR switch output leads 48 are connected, for example via a ribbon cable 50, to a microprocessor portion 52 of the control system 26. A driver device 54 is controllingly coupled to the microprocessor 52 and, for purposes later described herein, is operative to receive various user input signals $Y_1$–$Y_N$.

Figure 3:
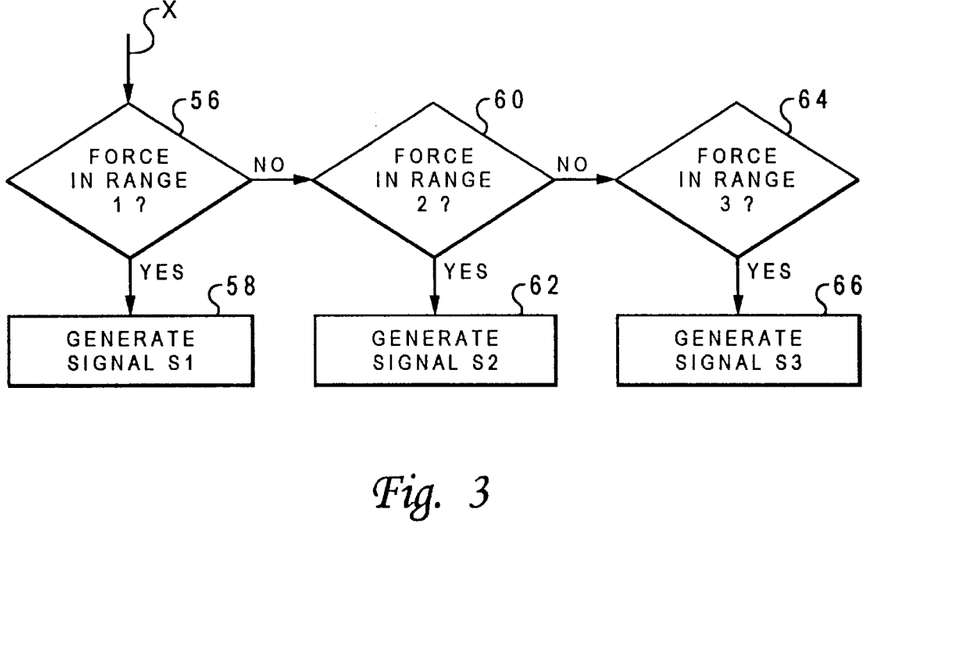
FIG. 3 is a basic logic flow diagram illustrating the keyboard's capability of selectively varying the keystroke output function signal of a representative one of its keys in accordance with a predetermined relationship with different ranges of depression force applied to the key.

Referring now to FIGS. 2 and 3, according to a primary aspect of the present invention, the microprocessor 52 is operative to receive (via one of the leads 48) a switch output signal X from a forcibly depressed key 28, the signal X having a magnitude related in a predetermined manner to the key stroke force F exerted on the key. Microprocessor 52 is programmed, either in a default mode or in a selectively variable manner by a computer user as later described herein, to categorize the magnitude of the incoming signal X as being within one of a plurality (representatively three in number) of different predetermined force ranges and responsively generate key stroke output signals $S_1$, $S_2$ and $S_3$ each corresponding to a different one of the three key stroke force ranges and having a different function associated with the key stroke.

By way of example, the first force range would include a force greater than zero and less than a predetermined first force; the second force range would include a range from the first force up to a predetermined second force; and the third force range would encompass any force greater than the predetermined second force.

More specifically, with reference to the microprocessor logic flow diagram shown in FIG. 3, upon microprocessor receipt of a signal X in response to the striking of a particular key 28, a query is made at step 56 as to whether the associated key stroke force F is within the first predetermined force range. If it is, the key stroke output signal $S_1$ is generated at step 58. If it is not, a query is made at step 60 as to whether the force is within the second predetermined force range. If at step 60 the associated keystroke force F is determined to be within the second predetermined force range, the key stroke output signal $S_2$ is generated at step 62. If it is not, a query is made at step 64 as to whether the force F is in the third predetermined key stroke force range, with a positive determination causing the generation of the key stroke output signal $S_3$ at step 66.

As to the separate predetermined first, second and third key stroke functions respectively assigned to the first, second and third (i.e., low, medium and high) key stroke force ranges for a given key which has been operatively struck to close its associated FSR switch 44, these could representatively be (1) a "key pressed in error—do not generate" function (associated with the low key stroke force range) which would result in the character associated with the struck key not being created on the display screen 22; (2) a "normal" keyboard function (associated with the medium key board stroke force range) which would result in the display on the screen 22 of the struck key's associated character as it would appear if the key's switch was of a conventional on/off type; and (3) an "altered character appearance" function (associated with the high key stroke force range) in which the key's screen-displayed image was, for example, bolded, capitalized, italicized or underlined.

Utilizing this core force-based concept of the present invention, the functionality of the keyboard 12 is substantially increased due to the ability of the keyboard to discern different key stroke force levels and use this sensed information to permit the same key to perform more than one function without the previous requirement of a supplemental user action such as simultaneously pressing another key, highlighting a key-generated character and carrying out a subsequent step to alter the character's appearance, or selecting a formatting alteration prior to the striking of the key.

While the foregoing example of the various functions that could be imparted to a single key by enabling the keyboard to sense and categorize various key stroke force ranges was geared to altering the appearance of a character normally associated with a key, other functions (such as "hot key" functions) could just as easily be associated with one of the plurality of sensed key stroke force levels. And, the multi-function, force-based aspects of the invention are not limited to character-generating keys on a keyboard—they could also be applied to increase the number of functions which could be achieved by the depression of a given function key (such as, for example, the F1–F12 keys, and the "Shift", "Ctrl" and "Alt" keys).

It should be noted that FSR switch structures representatively utilized in conjunction with the keyboard 12 are preferred because they conveniently serve both as (1) switch means for indicating to the control system 26 that a particular key 28 has been struck, and (2) force sensing means for determining the level of the key stroke force which closed the switch means. However, as will be readily appreciated by those of skill in this particular art, separate switch means and force sensing means could be utilized if desired. And, of course, other types of force sensing mechanisms could be employed if desired.

It will also be readily appreciated by those of skill in this particular art that while all of the keys 28 on the keyboard 12 could be provided with the above-described force based increased functionality, some of the keys (for example the function keys) could be of the conventional on/off switch-type single function variety if desired.

In addition to a default key stroke force/key output signal function relationship mode programmed into the microprocessor, and operating as described above, the control system 26 (see FIG. 2) may also be utilized to very usefully permit a computer user to customize the keyboard 12 in a manner both (1) accommodating the user's particular typing "touch" relative to setting the plurality of different key stroke force ranges, and (2) setting the plurality of desired different key stroke output signal functions which are correlated in a predetermined fashion with the plurality of different force ranges.

Figure 4:
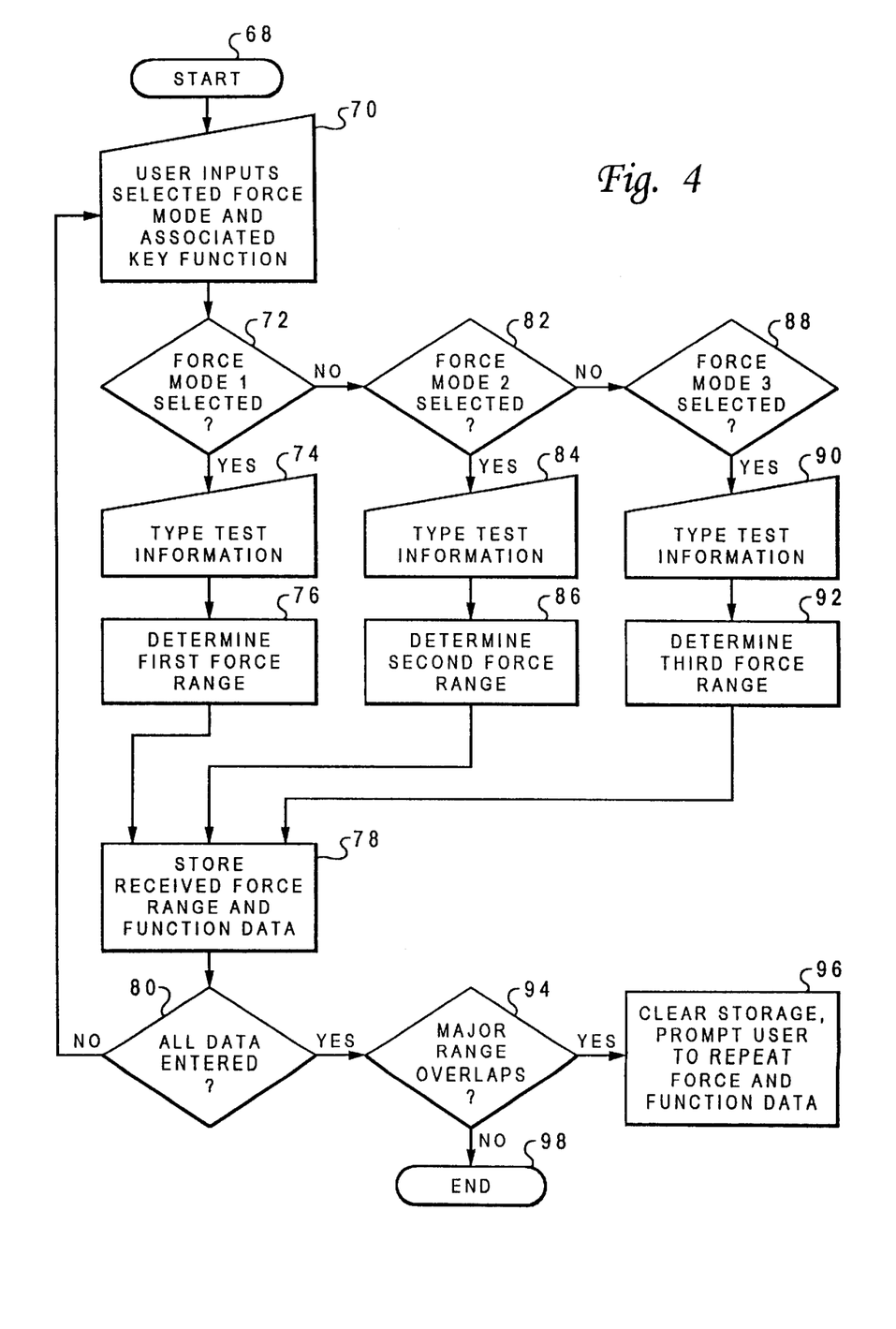
FIG. 4 is a logic flow diagram illustrating a manner in which a user of the keyboard may selectively establish the keystroke force ranges to suit his particular typing style, and additionally set the different keystroke out function signals associated with the established force ranges.

An example of this keyboard customizing capability is schematically shown in the microprocessor logic flow diagram of FIG. 4. In this flow diagram it is representatively assumed that the user will be setting three custom key stroke force ranges, and associating three selected corresponding key stroke output signal functions. Additionally, the FIG. 4 diagram illustrates how a single user may customize the keyboard 12. By simply expanding the input capability of the system 26 in an appropriate manner, however, the system could be separately customized for two or more users of the computer.

As shown in FIG. 4, after starting the force/function customization process at step 68, via appropriate input signals Y to the driver device 54 (see FIG. 2) the user selects (1) force mode 1 (i.e., the lowest key stroke force range) and (2) its associated key stroke output signal function in step 70. After this input a query is made at step 72 as to whether force mode 1 and its associated output function have been selected by the user. Upon verification that force mode 1 and its associated key stroke output signal function have been selected, the system, at step 74, prompts the user to type in test information (such as a preset paragraph of test text) using a key stroke force which the user wishes the system to characterize as a "low" typing force.

Utilizing the key stroke data input at step 74 by the user, the system determines at step 76 the corresponding first or "low" key stroke force range associated with the user, and at step 78 stores the determined force and key function data in an appropriate storage area of the computer. After storage of this initial force/function data at step 78, the system determines at step 80 that further force/function data has yet to be entered and transfers back to step 70 at which point the user selects force mode 2 (i.e., the "medium" key stroke force range) and its associated second key stroke output signal function.

The selection of this second force/function category routes the process, via query steps 72 and 82, to step 84 in which the user again types in the test information, this time at a key stroke force level that he wants the system to categorize as a second or "medium" typing force level. From this user input the system, at step 86, establishes the second force range and stores the resulting force/function data at step 78. Since data relating to the third force range and its related key stroke output signal function has yet to be entered by the user, the query at the subsequent step 80 results in the return once again to step 70.

At step 70 the user selects force mode 3 (i.e., the "high" typing force level) and its associated third key stroke output signal function. Upon selection of this third force mode and related output function the queries at steps 72 and 82 cause the transfer to query step 88 which verifies this third force/function selection and transfers to step 90 in which the user again types in the test information—this time at a third typing force level that he wants the system to characterize as the "high" typing force level. After data input step 90 is completed, the system establishes the third key stroke force range at step 92 and stores this third force/function data at step 78.

Since all three sets of force/function data have now been entered, the subsequent query step 80 creates a transfer to step 94 in which the system checks the three established key stroke force ranges to determine whether they have any major overlaps (according to previously programmed-in criteria) which would render the overall operation of each multi-function key unreliable or otherwise unsuitable. If the three force ranges have this overlap problem the system, at step 96, clears the previously entered force/function data from storage and prompts the user to repeat the previously described customizing routine by re-entering the force and function data. If at step 94 it is determined that the three selected force ranges do not have any unsatisfactory overlaps, the customization routine is ended at step 98 and the now-customized keyboard 12 is ready for operation by the user. By inputting one or more appropriate signals Y to the system 26 (see FIG. 2), a subsequent user may return the system 26 to its default force/function relationship mode, or customize the keyboard in accordance with his own typing force characteristics and desired key functions.

Figure 5:
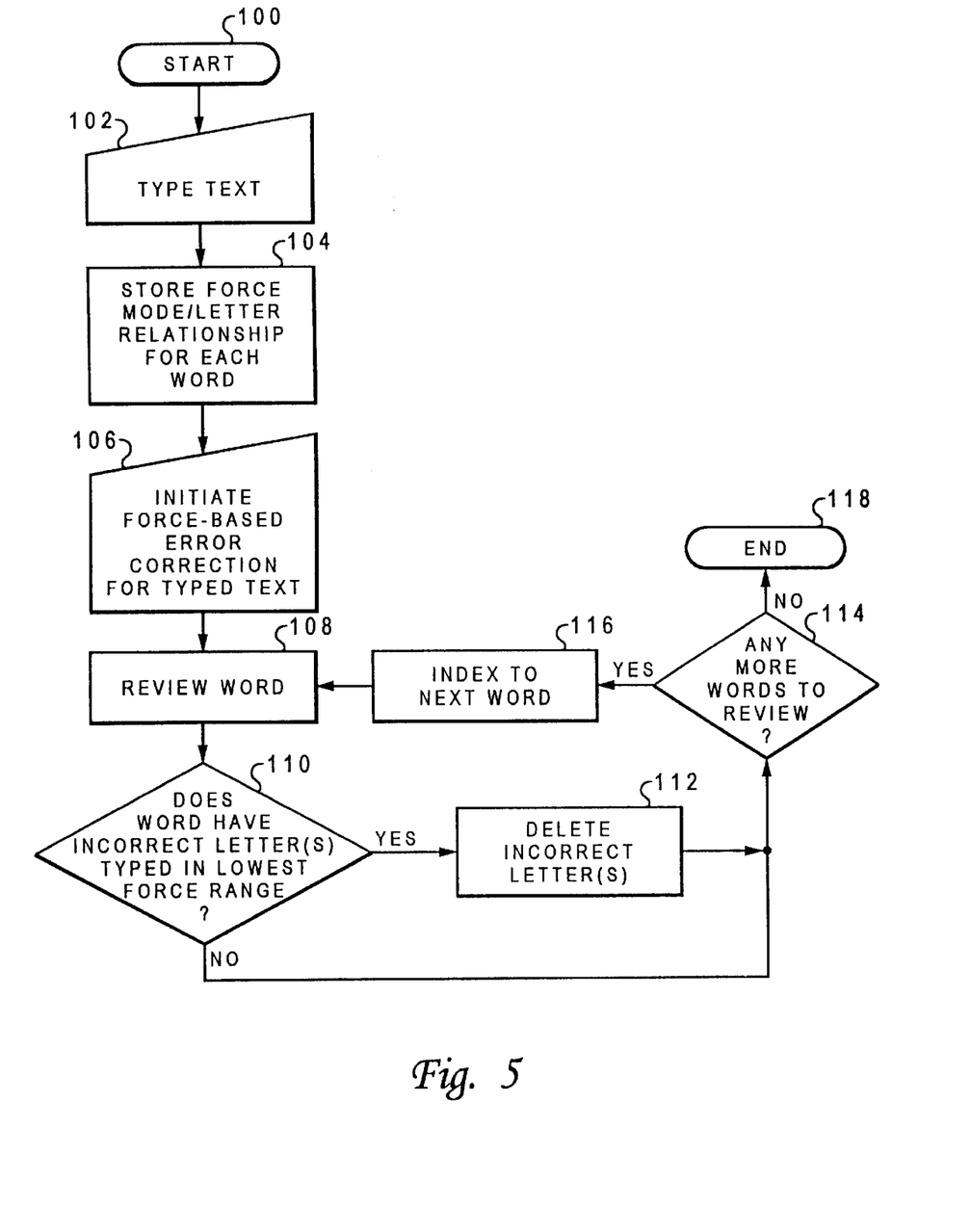
FIG. 5 is a logic flow diagram illustrating the operation of the programmable keyboard in a unique key force-based typing correction mode thereof.

In accordance with another feature of the present invention the key stroke force-based creation of a plurality of output functions for some or all of the keys 28 is utilized in a unique key stroke force-based typing correction routine schematically illustrated in the logic flow diagram in FIG. 5. After starting the routine at step 100, the user, at step 102, types in the text to be checked for errors by the system. Then, at step 104, the force mode/letter relationship for each typed word is stored (i.e., for each letter in each word the associated key stroke force range is stored). Next, after the user initiates the force-based error correction process at step 106, the first word in the typed text is selected for review at step 108 and a subsequent query is made at step 110 as to whether the selected word has any incorrect letter(s)—for example extraneous or double-struck letters—which were typed with a force in the lowest key stroke force range. If any such letters are detected in the word, each extraneous and improperly repeated letter typed with a force in the lowest force range is automatically deleted at step 112.

After this letter deletion, or if it was determined in step 110 that no correction of the selected word was necessary, a query is made at step 114 as to whether there are any more words to be reviewed. If there are, the system indexes at step 116 to the next word to be reviewed at step 108. The previously described word review and correction step loop 108-116 is then repeated until it is determined at step 114 that all of the words have been reviewed, at which point the force-based text correction routine is ended at step 118.

In accordance with another feature of the present invention, its key stroke force-based creation of multiple output functions for a given key may also used to provide for improved user password access protection for the computer 10 or another computer or electronic device with which the keyboard 12 may be utilized. This password access protection technique is schematically illustrated in the logic flow diagrams in FIGS. 6A and 6B, and basically requires a prospective user, as a prerequisite to using the computer 10, to enter a password which is correct from two standpoints —namely, (1) the textual correctness of the entered password, and (2) the correctness of the key stroke force level of each password character in accordance with a previously entered character/force level relationship.

Figures 6A, 6B:
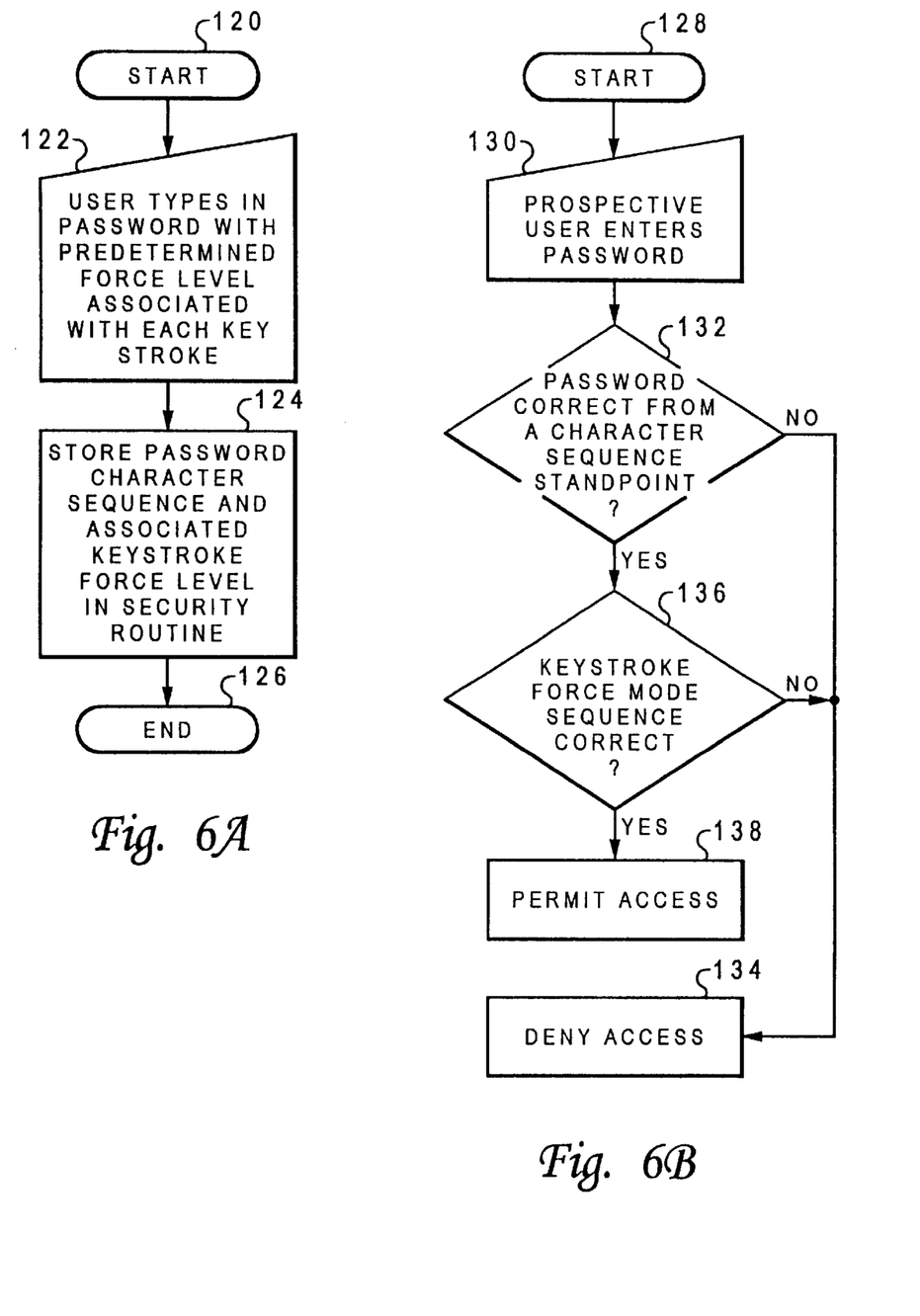
FIGS. 6A and 6B are logic flow diagrams respectively illustrating the programming and later operation of a unique combination character and key force-based system access password utilization of the keyboard's capabilities.

FIG. 6A illustrates the initial establishment of a user access password based on both password character sequence and character typing force levels. A user wishing to establish his personal access password initiates the program at step 120, and then types in his selected password in step 122, preferably varying the key stroke force levels for the password characters. For example, if the selected password is "DOG", and the keyboard is set up with two key stroke force ranges, the user may type in the password characters "D" and "O" at the low force level and then type the final character "G" at the high force level. As another example, if three detectable key stroke force ranges are available, the prospective user may choose to type in all password characters at the lowest force level, or use all three force levels in a predetermined sequence for the entered password characters. After entry of the selected password, at step 124 the system stores the password character sequence and associated force level sequence in an appropriate security routine, and then ends the password entry process at step 126.

Illustrated in the logic flow diagram of FIG. 6B is a process of the present invention which compares an entered password to the password previously stored in step 124 in FIG. 6A. After starting the password verification process at step 128, a prospective user of the computer 10 types in a password at step 130. At step 132 a query is then made as to whether the typed-in password is correct from a character sequence standpoint (i.e., whether "DOG" has been entered). If the entered password is incorrect from this standpoint (for instance, if "CAT" was typed in), access is denied at step 134.

On the other hand, if the entered password is correct from a character sequence standpoint a query is made in step 136 as to whether the entered password is correct from a key stroke force sequence (i.e., whether the letters "D" and "O" were entered with a keystroke force within the predetermined "low" force range, and the letter "G" was entered with a key stroke force within the predetermined "high" force range). If this second test is passed, the system permits access at step 138. If it is not, the system denies access at step 134.

As previously discussed herein, the present invention uniquely senses key switch closure force and provides a given key, in response solely to its operative depression at differing force levels, with a plurality of different output functions. However, the present invention also uniquely utilizes a combination of key stroke force and depression time to further expand the functionality of a given key.

Figure 7:
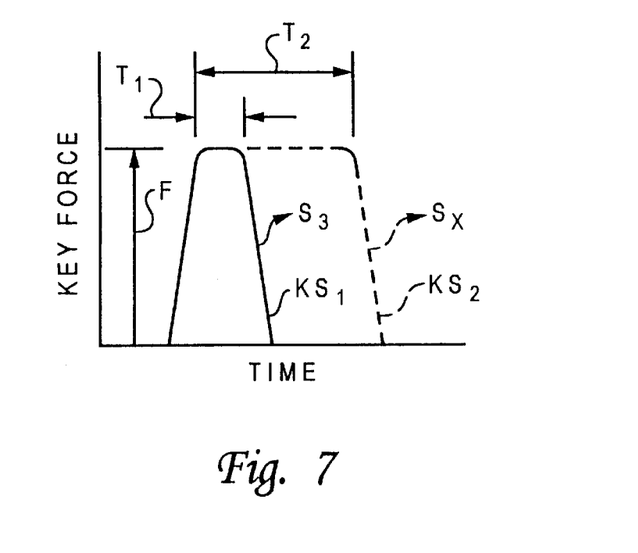
FIG. 7 is a simplified graphical illustration of a combination key force and depression duration technique provided by the invention to further expand the output signal variation capability of the keyboard's keys.

This further enhanced key functionality of the present invention is schematically illustrated in FIG. 7 which is a simplified graph that plots key depression force against the time duration of key depression. In describing FIG. 7 it will be assumed that a key 28 is being depressed with a key stroke force F which is in the predetermined "high" force range, and that the normal output function signal $S_3$ associated with this high force level causes the displayed letter associated with the key to be capitalized. It will also be assumed that during normal user typing of the key (illustrated by the solid line key stroke profile $KS_1$) at the force level F the key remains fully depressed for a time period $T_1$ to generate the output signal $S_3$.

The present invention adds to this force-related control of the key's output function a unique time augmentation aspect by changing the key stroke output signal $S_3$ to a different function output signal $S_X$ in response to the key being maintained in a fully depressed state at the force level F (as indicated by the partially dashed, horizontally widened key stroke profile $KS_2$) for a minimum time period $T_2$ greater than the "normal" typing key depression time $T_1$. As an example, the altered function signal $S_X$ could be utilized to bold the displayed key character (in response to the lengthened key depression time $T_2$) in addition to capitalizing the letter (in response to depressing the key with the "high" force range force F).

While the present invention has been representatively described as being embodied in a keyboard, it will be readily appreciated by those skilled in this particular art that it could also be employed in conjunction with other types of depressible switch or button members of which the illustrated keyboard keys are examples.

The foregoing detailed description is to be clearly understood as being given by way of illustration and example only, the spirit and scope of the present invention being limited solely by the appended claims.

What is claimed is:

1. Switch apparatus comprising:
   a switch member supported for depressions through operative strokes by selectively variable forces applied by a user to said switch member; and
   means for sensing the magnitudes of the switch member depression forces and responsively generating a plurality of different switch member stroke output signals which correspond in a predetermined manner to a plurality of different ranges of switch member stroke depression force and may be utilized in creating a plurality of different output functions for said switch member in sole response to its depression,
   said means for sensing being further operative to sense the duration of a depression of said switch member caused by a force within a selected one of said depression force ranges and responsively alter the corresponding switch member stroke output signal when said duration is longer than a predetermined time period.

2. The keyboard apparatus of claim 1 wherein said switch apparatus is a computer keyboard.

3. The switch apparatus of claim 1 wherein said means for sensing are operative to mechanically receive forces from said switch member in response to its depressions and utilize the mechanically received forces to generate said plurality of different switch member stroke output signals.

4. The switch apparatus of claim 3 wherein said means for sensing include a force sensing resistor device underlying said switch member.

5. The switch apparatus of claim 4 wherein said force sensing resistor device is operative as both a switch member stroke force detecting device and as a normally open switch device closeable in response to forcible depression of said switch member.

6. Keyboard apparatus comprising:
   a key structure supported for depressions through operative strokes by selectively variable forces applied by a user to said key structure;
   a force receiving structure operative to receive at least portions of the key structure depression forces and responsively generate key force signals each having a magnitude related in a predetermined variable manner to its associated key stroke depression force; and
   a control system operative to utilize key force output signals from said force receiving structure to responsively generate a plurality of different key stroke output signals which correspond in a predetermined manner to a plurality of different ranges of key stroke depression force and may be utilized in creating a plurality of different output functions for said key structure in sole response to its depression,
   said control system being further operative to sense the duration of a depression of said key structure caused by a force within a selected one of said depression force ranges and responsively alter the corresponding key stroke output signal when said duration is longer than a predetermined time period.

7. The keyboard apparatus of claim 6 wherein said control system is user operable to selectively variably set said different ranges of key stroke depression force.

8. The keyboard apparatus of claim 7 wherein said control system is further operable to automatically establish said different ranges of key stroke depression force in response to a monitoring of the typing of a user on said keyboard apparatus with differing key stroke depression force levels.

9. The keyboard apparatus of claim 6 wherein said force receiving structure is a combination force sensing and switch structure underlying said key structure for receipt of force therefrom during key structure depression.

10. The keyboard apparatus of claim 9 wherein said combination force sensing and switch structure is a force sensing resistor device.

11. The keyboard apparatus of claim 9 wherein said combination force sensing and switch structure has a normally open switch state.

12. The keyboard apparatus of claim 6 wherein said keyboard apparatus is a computer keyboard.

13. The keyboard apparatus of claim 12 wherein said computer keyboard is a desktop computer keyboard.

14. The keyboard apparatus of claim 12 wherein said computer keyboard is a portable computer keyboard.

15. The keyboard apparatus of claim 14 wherein said portable computer keyboard is a notebook computer keyboard.

16. Electronic apparatus comprising:
   a screen on which generated indicia may be displayed; and
   keyboard apparatus for use in generating indicia on said screen, said keyboard apparatus including:
      a plurality of key structures each supported for depressions through operative strokes by selectively variable forces applied by a user to the key structure, and control means for sensing the magnitudes of the key depression forces and responsively generating a plurality of different key stroke output signals which correspond in a predetermined manner to a plurality of different ranges of key stroke depression force and may be utilized in creating a plurality of different output functions for each key structure in sole response to its depression, said control means being further operative to sense the duration of a depression of at least one of said key structures caused by a force within a selected one of said depression force ranges and responsively alter the corresponding key stroke output signal when said duration is longer than a predetermined time period.

17. The electronic apparatus of claim 16 wherein said electronic apparatus is a computer.

18. The electronic apparatus of claim 17 wherein said computer is a portable computer.

19. The electronic apparatus of claim 18 wherein said portable computer is a notebook computer.

20. The electronic apparatus of claim 16 wherein said control means are operative to mechanically receive forces from said key structures in response to their depressions and utilize the mechanically received forces to generate said plurality of different key stroke output signals.

21. The electronic apparatus of claim 20 wherein said control means include force sensing resistor devices underlying said key structures.

22. The electronic apparatus of claim 21 wherein said force sensing resistor devices are operative as both key stroke force detecting devices and as normally open key switch devices closeable in response to forcible depression of their associated key structures.

23. The electronic apparatus of claim 16 wherein said control means are user operable to selectively variably set said different ranges of key stroke depression force.

24. The electronic apparatus of claim 23 wherein said control means are operable to automatically establish said different ranges of key stroke depression force in response to a monitoring by said control means of the typing of a user on said keyboard apparatus with differing key stroke depression force levels.

25. Electronic apparatus comprising:
a screen on which generated indicia may be displayed; and
keyboard apparatus for use in generating indicia on said screen, said keyboard apparatus including:
a plurality of key structures each supported for depressions through operative strokes by selectively variable forces applied by a user to the key structure, and
control means for sensing the magnitudes of the key depression forces and responsively generating a plurality of different key stroke output signals which correspond in a predetermined manner to a plurality of different ranges of key stroke depression force and may be utilized in creating a plurality of different output functions for each key structure in sole response to its depression,
said control means being selectively operable to detect incorrect characters in typed text and the depression force range associated with each detected incorrect character, and automatically delete each detected incorrect character which was generated in response to a key stroke depression force within a predetermined one of said key stroke depression force ranges.

26. The electronic apparatus of claim 25 wherein said predetermined one of said key stroke depression force ranges is the lowest one of said depression force ranges.

27. Electronic apparatus comprising:
a screen on which generated indicia may be displayed and
keyboard apparatus for use in generating indicia on said screen, said keyboard apparatus including:
a plurality of key structures each supported for depressions through operative strokes by selectively variable forces applied by a user to the key structure, and
control means for sensing the magnitudes of the key depression forces and responsively generating a plurality of different key stroke output signals which correspond in a predetermined manner to a plurality of different ranges of key stroke depression force and may be utilized in creating a plurality of different output functions for each key structure in sole response to its depression, said control means being further operable, in response to the typing of an access password on said keyboard apparatus by a prospective user of said electronic apparatus, to:
detect the character content and sequence of the typed-in password,
detect the key stroke depression force range associated with each typed-in password character, and
permit the prospective user operative access to said electronic apparatus only if:
(1) the character content and sequence of the typed-in password matches the character content and sequence of a predetermined password, and
(2) the key stroke depression force range of each typed-in character matches a predetermined key stroke depression force range associated with the corresponding character of the predetermined password.

28. A computer comprising:
a screen on which generated indicia may be displayed; and
keyboard apparatus for use in generating indicia on said screen, said keyboard apparatus including:
key structures supported for depressions through operative strokes by selectively variable forces applied by a user to said key structures,
force receiving structures associated with said key structures and operative to receive at least portions of the key stroke depression forces and responsively generate key force signals each having a magnitude related in a predetermined variable manner to its associated key stroke depression force; and
a control system operative to utilize key force output signals from said force receiving structures to responsively generate, for each key structure, a plurality of different key stroke output signals which correspond in a predetermined manner to a plurality of different ranges of key stroke depression force and may be utilized in creating different output functions for the key structure in sole response to its depression,
said control system being further operative to sense the duration of a depression of at least one of said key structures caused by a force within a selected one of said key stroke depression force ranges and responsively alter the corresponding key stroke output signal when said duration is longer than a predetermined time period.

29. The computer of claim 28 wherein said computer is a portable computer.

30. The computer of claim 29 wherein said portable computer is a notebook computer.

31. The computer of claim 28 wherein said force receiving structures are force sensing resistor devices underlying said key structures.

32. The computer of claim 31 wherein said force sensing resistor devices are operative as both key stroke force detecting devices and as normally open key switch devices closeable in response to forcible depression of their associated key structures.

33. The computer of claim 28 wherein said control system is user operable to selectively variably set said different ranges of key stroke depression force.

34. The computer of claim 33 wherein said control system is operative to automatically establish said different ranges of key stroke depression force in response to a monitoring by said control system of the typing of a user on said keyboard apparatus with differing key stroke depression force levels.

35. A computer comprising:
- a screen on which generated indicia may be displayed; and
- keyboard apparatus for use in generating indicia on said screen, said keyboard apparatus including:
  - key structures supported for depressions through operative strokes by selectively variable forces applied by a user to said key structures,
  - force receiving structures associated with said key structures and operative to receive at least portions of the key stroke depression forces and responsively generate key force signals each having a magnitude related in a predetermined variable manner to its associated key stroke depression force; and
  - a control system operative to utilize key force output signals from said force receiving structures to responsively generate, for each key structure, a plurality of different key stroke output signals which correspond in a predetermined manner to a plurality of different ranges of key stroke depression force and may be utilized in creating different output functions for the key structure in sole response to its depression,
  - said control system being selectively operable to detect incorrect characters in typed text and the depression force range associated with each detected incorrect character, and automatically delete each detected incorrect character which was generated in response to a depression force within a predetermined one of said depression force ranges.

36. The computer of claim 35 wherein said predetermined one of said depression force ranges is the lowest one of said depression force ranges.

37. A computer comprising:
- a screen on which generated indicia may be displayed: and
- keyboard apparatus for use in generating indicia on said screen, said keyboard apparatus including:
  - key structures supported for depressions through operative strokes by selectively variable forces applied by a user to said key structures,
  - force receiving structures associated with said key structures and operative to receive at least portions of the key stroke depression forces and responsively generate key force signals each having a magnitude related in a predetermined variable manner to its associated key stroke depression force; and
  - a control system operative to utilize key force output signals from said force receiving structures to responsively generate, for each key structure, a plurality of different key stroke output signals which correspond in a predetermined manner to a plurality of different ranges of key stroke depression force and may be utilized in creating different output functions for the key structure in sole response to its depression,
  - said control system being further operative, in response to the typing of an access password on said keyboard apparatus by a prospective user of said computer, to:
    - detect the character content and sequence of the typed-in password,
    - detect the key stroke depression force range associated with each typed-in password character, and
    - permit the prospective user to operatively access said computer only if:
      (1) the detected character content and sequence of the typed-in password matches the character content and sequence of a predetermined password, and
      (2) the detected key stroke depression force range for each typed-in password character matches a predetermined key stroke depression force range associated with the typed-in password character.

* * * * *